United States Patent [19]

André et al.

[11] Patent Number: 5,137,987
[45] Date of Patent: Aug. 11, 1992

[54] THERMOSETTABLE POLYOL RESINS

[75] Inventors: Olivier L. P. André; Carien H. P. Gerets; Henricus P. H. Scholten, all of Louvain-la-Neuve, Belgium

[73] Assignee: Shell Oil Company, Houston, Tex.

[21] Appl. No.: 668,826

[22] Filed: Mar. 13, 1991

[30] Foreign Application Priority Data

Mar. 23, 1990 [GB] United Kingdom ................. 9006577

[51] Int. Cl.⁵ .................. C08L 63/00; C08F 22/00
[52] U.S. Cl. .................. 525/438; 525/533; 528/92; 528/112; 528/115; 528/176; 528/180; 528/194; 528/361
[58] Field of Search .................. 528/361, 92, 112, 115, 528/176, 180, 194, 361; 525/438, 533; 523/402

[56] References Cited

U.S. PATENT DOCUMENTS

| | | | |
|---|---|---|---|
| 4,232,135 | 11/1980 | Bentley et al. | 525/509 |
| 4,314,918 | 2/1982 | Birkmeyer et al. | 260/20 |
| 4,405,763 | 9/1983 | Kooymans et al. | 525/438 |
| 4,755,583 | 7/1988 | Scholten et al. | 528/110 |
| 5,051,492 | 9/1991 | Andre et al. | 528/361 |

FOREIGN PATENT DOCUMENTS 0281213  4/1988  European Pat. Off. .

Primary Examiner—John Kight, III
Assistant Examiner—Shelley Wright

[57] ABSTRACT

Thermosettable polyol resins for coating compositions are prepared by reacting a polyglycidyl ester of an aliphatic polycarboxylic acid and a di- to hexa-hydric aliphatic alcohol with an adduct of a di- to hexa-hydric aliphatic alcohol and a glycidyl ester of a branched aliphatic monocarboxylic acid with 5 to 15 C-atoms, said adduct having an epoxy group content of less than 0.2 meq/g.

8 Claims, No Drawings

THERMOSETTABLE POLYOL RESINS

BACKGROUND OF THE INVENTION

This invention relates to the preparation of thermosettable polyol resins and to their use in coating compositions.

U.S. Pat. No. 4,232,135 discloses a process in which a glycidyl ester of a mixture of $C_{9-11}$ branched aliphatic acids is reacted at 100° C. with trimethylolpropane (hereinafter "TMP") in a glycidyl/primary hydroxyl group equivalent ratio of 2:3, in the presence of a boron trifluoride etherate etherification catalyst. However, side reactions between the alcohols, the glycidyl ester, and secondary hydroxyl groups take place in the presence of this boron trifluoride etherate catalyst. With gel permeation chromatography, the product of this process has been found to contain several side products. These products have a wide molecular weight distribution and are less suitable for coating applications.

It is therefore an object of the invention to provide a process for preparing a thermosettable polyol resin suitable for use in coating applications. It is another object of the invention to provide a thermosettable polyol resin which has a narrow molecular weight distribution and excellent flow.

BRIEF SUMMARY OF THE INVENTION

According to the invention, there is provided a process for preparing a thermosettable polyol resin which comprises: (a) preparing an adduct having an epoxy group content of less than 0.2 meq/g and at least one unreacted primary hydroxyl group by reacting in the presence of a zinc, iron or tin compound etherification catalyst a glycidyl ester of a branched aliphatic monocarboxylic acid having from 5 to 15 carbon atoms with a polyhydric aliphatic alcohol containing from 2 to 6 primary hydroxyl groups; and (b) reacting the adduct successively with i) an aliphatic diacarboxylic acid, or a glycidyl ester or anhydride thereof, and ii) a polyhydric aliphatic alcohol containing from 2 to 6 primary hydroxyl groups, until the final product has an epoxy group content of less than 0.07 meq/g.

Further according to the invention, there is provided a coating composition comprising a thermosettable polyol resin prepared by such process.

DETAILED DESCRIPTION OF THE INVENTION

In order to provide resin systems suitable for coatings, it has been found that polyol resins can be prepared that have an improved color and a narrow molecular weight distribution. Such resins are essentially free from unreacted primary alcohol starting material and are substantially free of unconverted epoxy groups. The present invention provides a process for preparing such a thermosetting resin.

An adduct is first prepared by reacting, in the presence of a zinc, iron or tin compound etherification catalyst, a glycidyl ester of a branched aliphatic monocarboxylic acid having from 5 to 15 carbon atoms with a polyhydric aliphatic alcohol containing from 2 to 6 primary hydroxyl groups in such a ratio that the adduct has an epoxy group content of less than 0.2 meq/g and comprises at least one unreacted primary hydroxyl group. Then the adduct is reacted successively with a) either an aliphatic polycarboxylic acid, or a glycidyl ester or anhydride thereof, and b) a polyhydric aliphatic alcohol containing from 2 to 6 primary hydroxyl groups, and continuing the reaction until the final product has an epoxy group or an acid group content of less than 0.07 meq/g.

In the first step of the invention process, the catalyst employed selectively promotes the reaction of the glycidyl ester with a primary hydroxyl group, thereby avoiding unwanted reactions between alcohols, between glycidyl esters, or between glycidyl esters and secondary hydroxyl groups. These side-reactions take place in the presence of catalysts such as boron trifluoride etherate. With gel permeation chromatography (GPC), the product using boron trifluoride etherate catalyst can be shown to contain several unwanted side-products. In contrast, the invention process leads in the first step to selective production of derivatives in which the proportion of converted primary hydroxyl groups can be set at a predetermined value, preferably 1 or 2 when converting trihydric alcohols, 2 for tetrahydric, and 2 or 3 for penta- or hexahydric alcohols. In contrast to the prior art, the adducts made in the first step are characterized by a molecular weight distribution, calculated as $M_Z \cdot M_W^{-1}$, of less than 1.10 which produces products of the total synthesis having suitable molecular weight distribution. When reacting dihydric alcohols, at least one unconverted primary hydroxyl group should remain in the adduct. In that event, the further introduction of converted acid, acid anhydride or epoxy moieties into the molecule in the second reaction proceeds via reacting the remaining primary hydroxyl group and via reacting the secondary hydroxyl group which results from the conversion of the glycidyl group of the glycidyl ester employed in the first step.

Suitable examples of etherification catalysts include halides and salts of alkanoic and naphthenic acids, particularly of those having 2 to 30 carbon atoms per molecule. Very suitable catalysts are tin, zinc or iron chlorides, tin or zinc alkanoates, dibutyltin dialkanoates, and iron salts of naphthenic acids. Preferred catalysts are tin(II)octoate, tin dichloride, dibutyltin dilaurate and tin tetrachloride, the former being the most preferred.

The catalyst may be employed at relatively low amounts and low reaction temperatures. Thus, addition of about 0.01 to 0.4% m/m of catalyst while heating the reaction mixture to a temperature in the range of from about 100° to 200° C. is adequate. Particularly suitable amounts of catalyst range from about 0.03 to 0.35% m/m, most suitable from about 0.05 to 0.2% m/m. The reaction may very suitably be carried out at a temperature in the range of from about 115° to 190° C., preferably from about 130° to 175° C.

The aliphatic primary di- to hexahydric alcohol has two to six primary hydroxyl groups (i.e., $HOCH_2-$), optionally one or more ether links, and preferably no other secondary ($HOCH-$), or tertiary ($HOC-$) hydroxyl groups. Suitable compounds are any of the isomers corresponding to tri(hydroxymethyl)ethane, -propane (TMP), -butane, -pentane, -hexane, -heptane, -octane, and -nonane; tetra(hydroxymethyl)methane, -ethane, -propane, -butane, -pentane, -hexane, -heptane, and -octane; penta(hydroxymethyl)ethane, -propane, -butane, -pentane, -hexane, -heptane; and hexa(hydroxymethyl)ethane, -propane, -butane, -pentane, and -hexane; dihydroxyethane, -pentane, -hexane and -dodecane.

In a preferred embodiment, the aliphatic primary alcohol is TMP, the dimer of TMP (DTMP) or neopentylglycol (NPG). This applies to the alcohol of both the first and the third reaction steps.

The glycidyl ester of the branched monocarboxylic acid may suitably be any of the glycidyl esters of $C_{5-15}$ branched aliphatic acids or a mixture thereof. Preferred esters are mixtures of glycidyl esters of $C_{9-11}$ branched aliphatic acids, commercially known as CARDURA ® E10. Another preferred glycidyl ester is the one derived from pivalic acid. Preferably, in the first reaction step the relative amount of starting materials is such that the product contains essentially no unreacted glycidyl ester.

Suitable aliphatic polycarboxylic acids or glycidyl esters or anhydrides in the second step are particularly cycloaliphatic compounds. Preferred polyglycidyl esters are the diglycidyl esters of dicarboxylic acids, most preferred is the diglycidyl ester of hexahydrophthalic acid. A commercially available grade is EPIKOTE ® 191. Preferred carboxylic acids and anhydrides are hexahydrophthalic acid and its anhydride.

In the further reaction with an aliphatic polycarboxylic acid or a glycidyl ester or an anhydride and a polyhydric aliphatic alcohol the molar ratios should be selected such that in the final product a sufficient number of unreacted primary hydroxyl groups remain to allow for adequate thermosetting performance, i.e. curability. Since the curing substantially proceeds via reactions of free primary hydroxyl groups, there is no need to provide for unreacted glycidyl or acid groups in the final product. Therefore it is preferred that the epoxy group or acid group content of the final product does not exceed 0.04 meq/g.

The process of this invention allows for the construction of polyol molecules which can schematically be represented by the formulae:

| | |
|---|---|
| CE10-TMP-(E191-NPG)$_2$ | (CE10)-$_2$PE-(E191-NPG)$_2$ |
| CE10-TMP-(HHPA-TMP)$_2$ | NPG-HHPA-CE10-NPG-HHPA-NPG |
| CE10-NPG-E191-NPG | TMP-HHPA-CE10-NPG-HHPA-TMP |
| CE10-PE-(E191-NPG)$_3$ | NPG-E191-CE10-NPG-E191-NPG | in which CE10, TMP, NPG, PE, E191 and HHPA respectively stand for the moieties of CARDURA ® E10, trimethylolpropane, neopentylglycol, pentaerythritol, EPIKOTE ®-191 and hexahydrophthalic acid. In those structures, there are primary hydroxyl groups in the NPG or TMP end groups, and in addition there may be secondary hydroxyl groups in the CARDURA ® moieties and EPIKOTE ® moiety, resulting from the etherification of the glycidyl groups. As stated hereinbefore, the cure of the polyol resins will primarily be ensured by the presence of primary hydroxyl groups, with the secondary hydroxyl groups playing a minor role.

If desired, the invention process may be carried out in the presence of a suitable non-reactive solvent, for example, hydrocarbons such as octane, nonane, decane, toluene, the three xylenes, ethylbenzene or isopropylbenzene; ethers such as 1,4-dioxane, diethylether of ethylene glycol, diethylether of diethylene glycol; and chlorinated hydrocarbons such as monochlorobenzene. Alcohols, aldehydes, ketones and the like are considered less suitable since they may form undesired by-products.

The favorable properties of the polyol resins according to the invention offer good possibilities for application of the resins in solvent coating systems, particularly those for ambient cure. Other possible applications are in stoving enamels, powder coatings, and anionic or cathodic electrodeposition coatings. For the latter coatings, the resins of the present invention are first modified with an acid or a base (such as an amine), neutralized, and then applied together with a suitable cross-linking agent.

The polyol resins are suitable for use in high-performance automotive high solids topcoats. Useful cross-linking resins in this respect are for example those disclosed in U.S. Pat. No. 4,755,583 and in European patent application 281,213, which include, for example, phenol-formaldehyde resins, bisphenolic curing agents, aminoplast resins, anhydride curing agents, polycarboxylic compounds and dicyandiamide. Particularly suitable cross-linking agents are the aminoplast-type resins, such as alkoxylated reaction products of formaldehyde with melamine or benzoguanamide. Other suitable cross-linking resins include urea-aldehyde resins, phenol-aldehyde resins, and blocked isocyanates.

Suitable cross-linking catalysts which may be employed in the curable coating compositions are acids such as orthophosphoric acid or p-toluenesulphonic acid. These catalysts are typically used in an amount within the range of about 0.05 to about 2% by weight, based on polyol resin and cross-linking resin.

The relative proportions of polyol resin and curing agent are those generally employed in the curable binders, typically from about 5 to 50% by weight, calculated on the total of polyol resin and cross-linking resin.

The polyol resins of this invention are primarily intended to be employed in surface coatings. Other applications, such as in laminates or castings are also possible. The resins may be blended with conventional solvents such as aliphatic or aromatic hydrocarbons. Pigments, fillers, dispersing agents and other components known for coating formulations may be added to the curable binder system comprising the polyol resins made in accordance with the invention process. Moreover, cured coatings prepared from such polyol resins have very good properties in general industrial stoving application. Particularly, they have a very good balance of flow, hardness and flexibility in heat-cured coatings.

The curable coating composition can be applied by a variety of methods as known in the art, for example, by spraying, dipping or roller coating. The coatings can be hardened by stoving, for example at temperatures from about 100° to about 300° C., with curing temperatures varying from about 10 seconds to about 30 minutes.

EXAMPLE 1 a) Adduct of TMP and CE10

1 mole of TMP and the indicated number of moles of CARDURA ® E10 were homogenized at 100° C., and 0.10% by weight of stannous octoate catalyst was added. The mixture was reacted at 160° C. for 2.5 hours, at the end of which period the epoxy group content (EGC) of the mixture had decreased to 0.04 meq/g.

b) Reaction of EPIKOTE ® 191 and product a)

2 moles of EPIKOTE 191 were added to the mixture resulting from the synthesis a). The solution was heated to 160° C. following adjustment of the amount of catalyst to yield a concentration of 0.15% by weight. The reaction was continued for 1.8 hours.

c) Final polyol product 2 moles of either TMP or NPG were incorporated into the reaction mixture, (no additional catalyst was added). The mixture was reacted at 160° C. for 1.5 hours, at the end of which period the EGC of the mixture had decreased to 0.04 meq/kg. Then the solution was cooled to ambient temperature and methyl PROXITOL solvent was added to produce a solids concentration of 20 to 30% by weight.

Analysis of the two products produced the following data:

|  | n | Mz | MWD | free alcohol % by weight | viscosity mPa.s |
|---|---|---|---|---|---|
| NPG | 0.5 | 2160 | 1.92 | 3.2 | 1840 |
| NPG | 1.0 | 1960 | 1.89 | 2.4 | 1250 |
| TMP | 0.7 | 1700 | 1.56 | 1.0 | 798 | d) Polyol evaluation
1) Clear film coating
Cross-linker: Hexamethoxymethylmelamine (HMMM)
Catalyst: p-toluenesulphonic acid blocked with a melamine (RESIMENE ®-6201 from MONSANTO)
Weight ratio Resin/HMMM: 85/15
Catalyst concentration: 2% by weight
Solids content: 30% by weight in methyl PROXITOL.
Bar coating thickness: 20 micron (dry film)
Cure time: 30 minutes
Cure temperature: 120° C.

|  |  | hardness, sec. | | flexibility cm.kg | | solvent res. dbl rubs | |
|---|---|---|---|---|---|---|---|
|  | n | 115° C. | 140° C. | 115° C. | 140° C. | 115° C. | 140° C. |
| NPG | 0.5 | 112 | 143 | 69 | 58 | 100 | 100 |
| NPG | 1.0 | 63 | 85 | >92 | 35 | 90 | 100 |
| TMP | 0.7 | 56 | 108 | 186 | 69 | 100 | 100 |

2) Pigmented coating
Cross-linker: HMMM
Catalyst: RESIMENE ®-6201
Pigment: Kronos CL310
Weight ratio Resin/HMMM: 75/25
Catalyst concentration: 3.3% by weight
Weight ratio pigment/(resin+HMMM): 0.4/1
Solids content: 70% by weight in methyl PROXITOL
Bar coating thickness: 30 micron (dry film)
Curing time: 30 minutes
Curing temperature: 120° C.

|  | n | hardness, sec. | flexibility cm.kg | gloss 20° | gloss 60° |
|---|---|---|---|---|---|
| NPG | 0.5 | 144 | 57 | 80 | 92 |
| NPG | 1.0 | 95 | 46 | 81 | 91 |

EXAMPLE 2 a) Reaction of anhydrides and product a)
2 mol of various anhydrides were respectively added to samples of the mixture resulting from the synthesis a) described in Example 1 (TMP, n=0.7). The anhydrides were phthalic anhydrides (PA), tetrahydrophthalic anhydride (TPA), hexahydrophthalic anhydride (HPA), and methylhexahydrophthalic anhydride (MHPA). The molar ratios employed were in all events 2 mol anhydride per 1 mol adduct of Example 1. The solutions were heated to 120° to 160° C., depending on the melting point of the anhydride. The reaction was continued for 0.50 hours.

b) Final polyol product
2 mol NPG were incorporated into the mixture, with addition of stannous octoate catalyst to adjust the catalyst concentration to 0.20% by weight. 5% by weight toluene was introduced to allow for azeotropic removal of water. The reaction was continued at 180° to 220° C. for 5 hours until the acid content had decreased to less than 0.04 meq/kg.

Analysis of the polyol products yielded the following data:

| Anhydride | Mz | MWD | free alcohol % by weight | viscosity mPa.s |
|---|---|---|---|---|
| PA* | 1210 | 1.40 | 1.0 | 1660 |
| TPA | 1100 | 1.35 | 1.1 | 1890 |
| HPA | 1160 | 1.38 | 0.9 | 1220 |
| MHPA | 1220 | 1.39 | 2.0 | 1670 |

*for comparison c) Polyol evaluation
1) Clear film coating:
Cross-linker: HMMM
Catalyst: RESIMENE ®-6201
Weight ratio Resin/HMMM: 75/25
Catalyst concentration: 2% by weight
Solids content: 70% by weight in methyl PROXITOL
Bar coating thickness: 40 micron (dry film)
Curing time: 30 minutes
Curing temperature: 120° C.

| Anhydride | hardness, sec. | flexibility cm.kg | solvent res. dbl rubs |
|---|---|---|---|
| PA* | 202 | 35 | >100 |
| TPA | 183 | 35 | >100 |
| HPA | 179 | 23 | >100 |
| MHPA | 197 | 23 | >100 |

*for comparison

2) Pigmented coating:
Cross-linker: HMMM
Catalyst: RESIMENE ®-6201
Pigment: Kronos CL310
Weight ratio Resin/HMMM: 75/25
Catalyst concentration: 3% by weight
Weight ratio pigment/(resin+HMMM): 0.4/1
Solids content: 70% by weight in methyl PROXITOL
Bar coating thickness: 40 micron (dry film)
Curing time: 30 minutes
Curing temperature: 120° C.

| Anhydride | hardness, sec. | flexibility cm.kg | gloss 20° | gloss 60° |
|---|---|---|---|---|
| PA* | 175 | 46 |  |  |
| TPA | 140 | 69 | 93 | 93 |
| HPA | 150 | 69 | 83 | 92 |
| MHPA | 165 | 115 |  |  |

*for comparison

EXAMPLE 3

The final product of Example 2 was evaluated in comparison with two products made with corresponding adducting recipes: Product c(1) was made by adducting 2 mol of HPA with 1 mol of 2,2-diethyl-1,3-propanediol and then adducting with NPG. Thus, in product c(1) no CARDURA® E10 was introduced in the molecule. In product c(2) 1 mol of 2,2-diethyl-1,3-propanediol was adducted with 2 mol HPA. Then the product was adducted with 1 mol CARDURA® E10 and 1 mol NPG. The final product solutions each had a solids content of 80% by weight.

Pigmented formulations were prepared by adding curing agent HMMM (weight ratio resin to curing agent 75:25) and KRONOS CL310 pigment (weight ratio pigment to resin+HMMM 0.7:1).

A known drawback of pigmented high solids resin systems is their poor stability as shown by phase separation occurring after some time of storage at room temperature. The three formulations were therefore tested for phase separation behavior. Comparative products c(1) and c(2) were stable for up to 13 days. The polyol product of the invention was stable for more than 42 days.

We claim:

1. A process for preparing a thermosettable polyol resin which comprises: (a) reacting, in the presence of a zinc, iron or tin compound etherification catalyst, a glycidyl ester of a branched aliphatic monocarboxylic acid having from 5 to 15 carbon atoms with a polyhydric aliphatic alcohol containing from 2 to 6 primary hydroxyl groups to produce an adduct having an epoxy group content less than 0.2 meq/g and at least one unreacted primary hydroxyl group, and (b) reacting the adduct successively with i) a cycloaliphatic dicarboxylic acid, or a glycidyl ester or anhydride thereof, and ii) the same or different polyhydric aliphatic alcohol containing from 2 to 6 primary hydroxyl groups, for a time sufficient to produce a thermosettable polyol having an epoxy or acid group content of less than 0.07 meq/g.

2. The process of claim 1 in which the amount of unreacted primary hydroxyl group following step (a) is 1 when the polyhydric aliphatic alcohol is dihydric, 1 or 2 when trihydric, 2 when tetrahydric, and 2 or 3 when penta or hexahydric.

3. The process of claim 1 in which the polyhydric alcohols are each independently dihydric or trihydric.

4. The process of claim 1 in which the polyhydric aliphatic alcohol is selected from the group consisting of trimethylolpropane and neopentylglycol.

5. The process of claim 1 in which the etherification catalyst is stannous octoate.

6. The process of claim 1 in which the dicarboxylic acid is hexahydrophthalic acid.

7. The process claim 1 in which the catalyst is selected from the group consisting of tin chloride, stannous-octoate, a dibutyltin(IV)alkanoate, and dibutyltin(IV)laurate.

8. A surface coating composition comprising a) the product of the process of claim 1, b) a curing agent, and c) an organic solvent.

* * * * *